Sept. 19, 1967           H. LORENZ           3,342,108
APPARATUS FOR MACHINING THE ENDS OF WORKPIECES
Filed Oct. 14, 1965           3 Sheets-Sheet 3
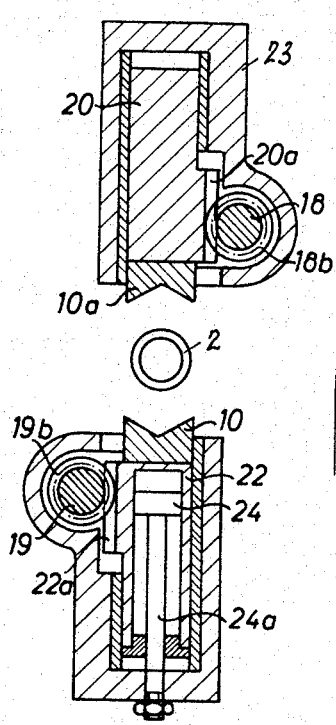
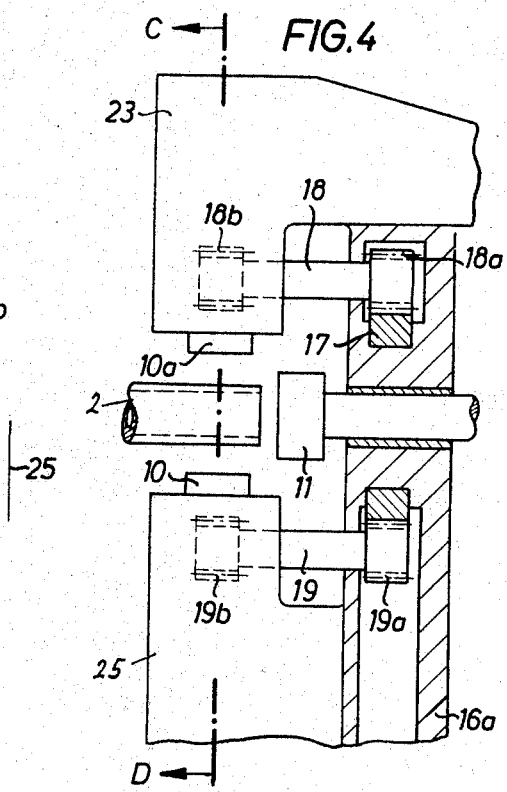
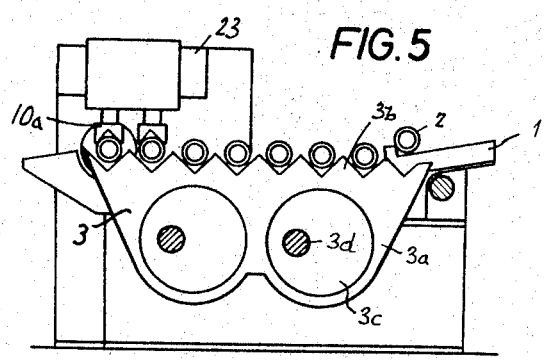
INVENTOR
Horst Lorenz
by Michael S. Striker

United States Patent Office 3,342,108
Patented Sept. 19, 1967

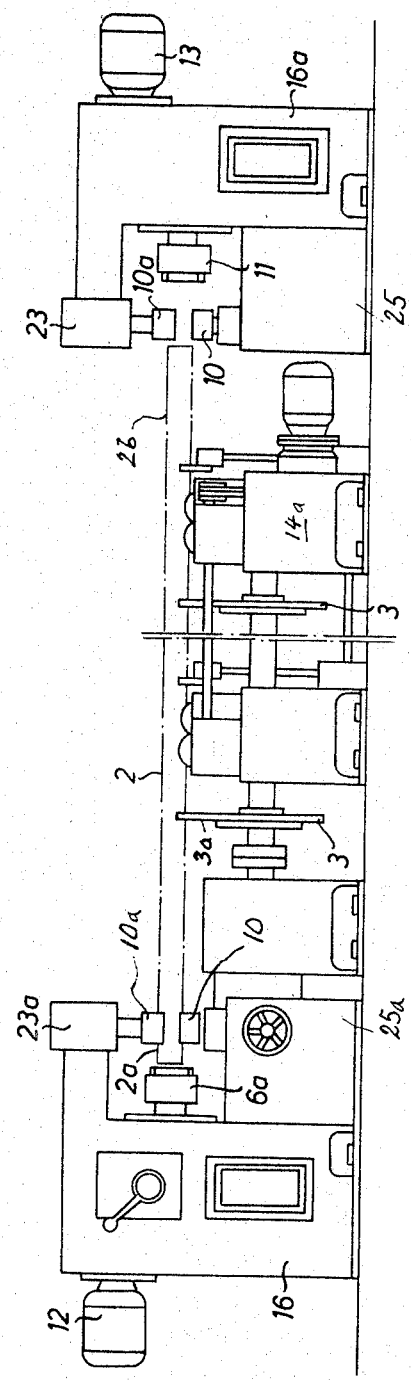

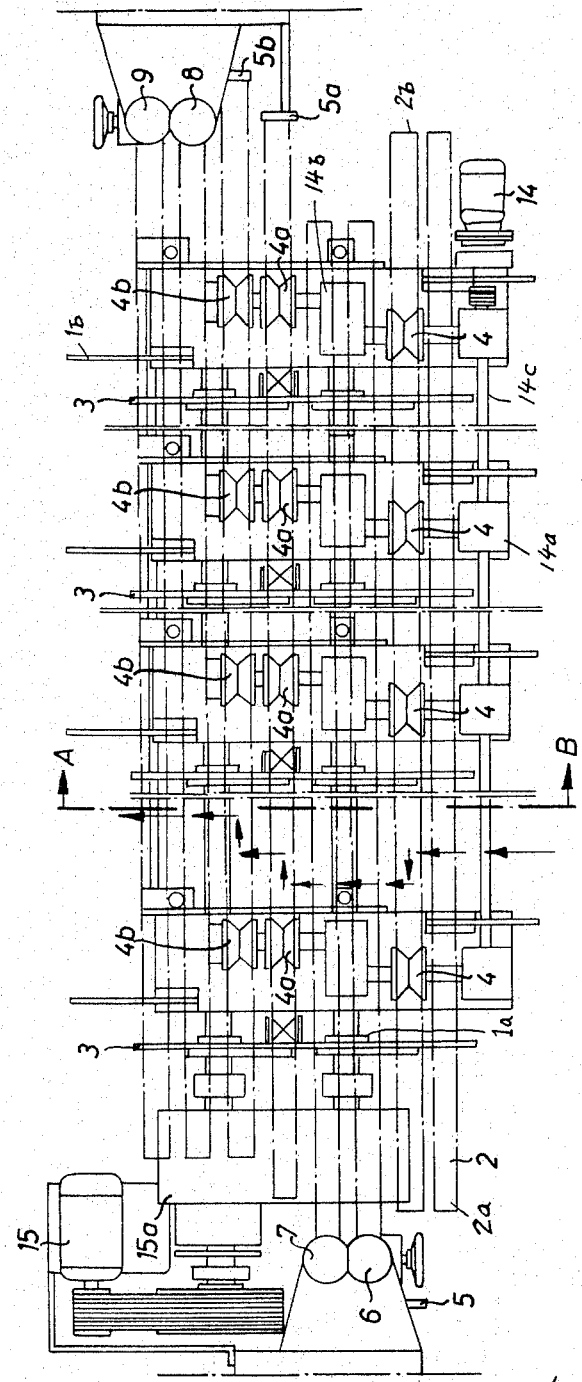

3,342,108
APPARATUS FOR MACHINING THE ENDS OF WORKPIECES
Horst Lorenz, Solingen, Germany, assignor to Kieserling, Th. & Albrecht, Solingen, Germany
Filed Oct. 14, 1965, Ser. No. 495,907
Claims priority, application Germany, Oct. 24, 1964, K 54,352
11 Claims. (Cl. 90—21)

The present invention relates to an apparatus for machining the ends of elongated workpieces, such as pipes, and more particularly to apparatus in which the pipes are transported in a transverse direction between a plurality of tools which act on the ends of the pipes while the same are clamped by suitable clamping means.

In known apparatus serving this purpose, the clamping means include pairs of clamping members which are movable the same horizontal plane in which the workpieces are transported to successive working positions in which different tools act on the same. The clamping members are connected with levers linked to toggle levers, and one of the toggle levers is operated by hydraulic means.

Due to the fact that the clamping members and toggle levers are arranged in a horizontal plane in the prior art constructions, the tools have to be spaced in this horizontal plane distances permitting the provision of the above described lever systems for operating the clamping means.

It is one object of the invention to overcome this disadvantage of known apparatus for machining the ends of elongated workpieces, and to provide apparatus in which the tools can be closely spaced along the path of movement of the workpieces.

Another object of the invention is to provide clamping means which are operable in a direction transverse to the plane in which the workpieces are transported.

Another object of the invention is to provide clamping means including a pair of clamping members movable in vertical direction for clamping a workpiece transported in a direction transverse to its length in a horizontal plane.

Another object of the invention is to provide an apparatus for machining the ends of elongated pipes which is of compact construction and takes up comparatively little space in a direction transverse to the longitudinal extension of the workpieces.

Another object of the invention is to provide clamping means including a driven clamping member, and to connect the driven clamping member with the other clamping member for simultaneous movement so that the clamping members move toward and away from each other for clamping the workpieces.

With these objects in view, one embodiment of the invention comprises means for supporting a series of elongated workpieces, such as pipes, in parallel positions in a preferably horizontal working plane, and for transporting the workpieces in a direction transverse to the longitudinal direction of the same along a path; tool means located on at least one side of the path, and preferably on both sides of the same in the horizontal working plane for machining the ends of the workpieces; and clamping means for clamping the workpieces during operation of the tools and including a pair of clamping members located on opposite sides of the working plane, at least one of the clamping members, and preferably both clamping members, being operable in a direction transverse to the working plane, preferably in vertical direction, for clamping workpieces in working positions during the operations of the tools.

In the preferred embodiment of the invention first transporting means are provided for transporting the workpieces in the working plane stepwise to a plurality of working positions, and second transporting means are provided for transporting each workpiece in longitudinal direction thereof into the region of a clamping means and tool.

In the preferred embodiment of the invention, each clamping means includes a clamping member secured to a hydraulic cylinder in which a stationary piston is located. Transmission means connect the cylinder with the other clamping member so that the clamping members are simultaneously operated when a pressure fluid is supplied to the cylinder.

This arrangement has the advantage that the clamping pressure can be adjusted independently of the diameter of the workpiece, since the clamping pressure depends only on the pressure of the fluid supplied to the hydraulic cylinder, whereas in the prior art constructions, the angles of the toggle levers have to be considered for adjusting the damping means to different diameters of the workpiece. Since the clamping members of the present invention are movable in vertical planes, the distances between adjacent tools are reduced as compared with the prior art, and the apparatus can be built more compactly whereby the cost of the apparatus is reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary schematic side elevation of an apparatus according to the embodiment of the invention;

FIG. 2 is a fragmentary schematic plan view of the apparatus shown in FIG. 1;

FIG. 3 is a sectional view taken on line C–D in FIG. 4;

FIG. 4 is a side elevation, partially in section, illustrating on a larger scale the details of the clamping means provided in the embodiment of FIGS. 1 and 2; and FIG. 5 is a front view, partially in section along line A–B illustrating on an enlarged scale transporting means used in the embodiment of FIGS. 1 and 2.

Referring now to the drawing, a plurality of elongated workpieces, shown to be pipes 2, are supplied by an inclined support 1, best seen in FIG. 5, to transporting means 3 including transverse plates 3a having a top edge formed with recesses 3b for supporting pipes 2 in parallel positions. Eccentric discs 3c are mounted in each plate 3a and rotated by shafts 3d which are driven by a transmission means 15a from a motor 15, as shown in FIG. 2 so that pipes 2 are moved along circular paths and either placed on rows of transporting rollers 4, 4a, 4b or on supports 1a, 1b intermediate these rollers.

Transporting rollers 4, 4a, 4b are driven over transmission means 14a and 14b from a shaft 14c rotated by a motor 14.

The arrangement is such that during each stroke of the transporting means 3, pipes 2 are successively raised, and placed on a row of aligned rollers 4, whereupon the further circular movement of transporting means 3 is carried out without the respective pipe which remains on the rollers 4.

Rollers 4 are rotated to transport a pipe deposited thereon to the left as viewed in FIG. 2 until the respective end 2a of a pipe transported by rollers 4 abut an abutment 5.

During the following strokes of the transporting means 3, pipe 2 is transported to a position resting on supports 1a, 1b aligned with a milling tool 6a, and with clamping means including clamping members 10a and 10b which are operable in vertical direction to clamp the end 2a of the respective pipe 2 while the tool 6a performs the milling operation.

Tool 6 performs a milling operation, and may also chamfer the end of the pipe. The chamfering may be done after a further step of transporting means 3 at a station 7, or a thread may be cut into the end of the pipe at station 7 by a suitable tool while the pipe is clamped.

During the next stroke of transporting means 3, the pipes are successively placed on rollers 4a which are rotated by transmission means 14b to rotate in a direction opposite to the direction of rotation of rollers 4 so that any pipe resting on transporting rollers 4a is driven towards the right as viewed in the drawing into engagement with a fixed abutment 5a so that the respective pipe is in an intermediate position when transporting means 3 performs its next stroke by which the respective pipe is transported from the rollers 4a to the rollers 4b which rotate in the same direction, and transport the respective pipe toward the right as viewed in FIG. 2 into abutment with a fixed abutment 5b in which the ends 2b are properly positioned to be milled and chamfered by tool 11 at station 8 where also clamping members 10a and 10 are provided for clamping the end of the pipe during the operation of tool 11.

The intermediate rollers 4a which are not associated with a working position of the transported pipe, and the abutment 5a, make it possible to transport even short pipes in the available time of a transporting stroke of transporting means 3 first to the intermediate position abutting abutment 5a, and then to the working position abutting abutment 5b.

In the next stroke of transporting means 3, the pipe is transported to the operating station 9 where it rests on a support while a thread is cut. Station 9 has also clamping means to clamp the ends 2b of the pipes during this operation. The pipes are then removed over rails 1b of the supporting means 1.

The construction of the clamping means of the invention will now be described with reference to FIGS. 3 and 4.

At each operating station, a support 16, or 16a for the respective tool, for example 6a and 11, as shown in FIG. 1, has a horizontal carrier arm 23, 23a supporting an upper clamping member 10a for vertical movement, while lower beds 25, 25a support lower clamping member 10 for vertical movement.

The upper clamping member 10a includes a clamping jaw and a carrier 20 which is guided in support 23 for sliding movement and has a rack portion 20a meshing with a pinion 18b which is secured to a shaft 18 carrying another pinion 18a. The lower clamping member includes a carrier 22 having a rack portion 22a meshing with a pinion 19b on a shaft 19 which carries another pinion 19a.

A circular gear ring 17 is mounted in support portion 16a for turning movement about an axis coinciding with the axis of rotation of the tool 11, and with the axis of a workpiece 2 in a working position. Gear ring 17 meshes with pinions 18a and 19a, so that the same, and also shafts 18 and 19 with pinions 18b, 19b rotate in synchronism causing a simultaneous synchronized motion of the clamping members 10, 10a toward and away from each other.

Carrier 22 of clamping member 10 is constructed as a cylinder in which a piston 24 is located. Piston 24 has a piston rod 24a secured by a nut to the stationary support 25 or 25a so that when a pressure fluid is admitted to one of the chambers formed by piston 24 in cylinder 22, clamping member 10 moves toward or away from the workpiece 2 and the other clamping member 10a.

As explained above, the transmission means 22a, 19b, 19, 19a, 17, 18a, 18, 18b, and 20a connect the clamping members for simultaneous movement so that the hydraulic drive means 24, 22 operates both clamping members of each clamping means.

Due to the fact that the clamping members 10, 10a are located in the same vertical planes, respectively, as the associated tools 6a, 11, the tools and clamping means can be spaced closely from each other, and as compared with known constructions in which the clamping jaws move in horizontal direction, a substantial amount of space is saved. The stroke of the transporting means 3, and the spacing of rollers 4, 4a, 4b can be made shorter than in constructions of the prior art.

The transporting means 3 transports the pipe in the direction transverse to the length thereof between a plurality of working positions located on the rollers 4, 4a, 4b, and in each working position, the pipe can be transported by the respective roller, for example roller 4b to a position in which its end is clamped by a pair of clamping members located opposite sides of the horizontal transporting and working plane, and being movable in vertical direction.

It will be understood that each of the elements described above, or two or more together, may also find a useful application in other types of apparatus for machining the ends of elongated workpieces differing from the types described above.

While the invention has been illustrated and described as embodied in clamping members movable in vertical direction for clamping the ends of pipes transported in a horizontal plane, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims

What is claimed as new and desired to be secured by Letters Patent is:

1. An apparatus for machining the ends of elongated workpieces, comprising, in combination, means for supporting a series of elongated workpieces in parallel positions in a working plane; transporting means for transporting the same in a direction transverse to the longitudinal direction of the same along a path successively to a working position; tool means located on at least one side of said path in said working plane registering with workpieces in said working position for machining one end of said workpieces; clamping means for clamping said end of each workpiece and located on said one side of said path and including a pair of clamping members located in a plane perpendicular to said working plane on opposite sides of said working plane, said clamping members being operable in the respective perpendicular plane in a direction transverse to said working plane for clamping said end of each workpiece in said working position; drive means for driving one of said clamping members; and motion transmitting means connecting said one driven clamping member with the other clamping member, and transmitting the motion imparted to said one driven clamping member to the other clamping member for moving said clamping members in opposite directions away from each other, and towards each other for clamping the workpiece.

2. An apparatus for machining the ends of elongated workpieces, comprising, in combination, transporting means for supporting a series of elongated workpieces in parallel positions in a working plane stepwise in a direction transverse to the longitudinal direction of the same along a path to a plurality of working positions; first and second cutting tool means located in said working plane on opposite sides of said path and spaced along the same so as to register with workpieces in successive working positions for machining the ends of said workpieces; first and second clamping means respectively located on opposite sides of said path spaced along the same and respectively located in the regions of said first and second tool means, each clamping means including a pair of clamping members located in a plane perpendicular to said working plane on opposite sides of said working plane, said clamping members being operable in the respective perpendicular plane in a direction transverse to said working plane for clamping said ends of said workpieces in said working position during operation of said tool means; drive means for driving one of said clamping members; and motion transmitting means connecting said one driven clamping member with the other clamping member, and transmitting the motion imparted to said one driven clamping member to the other clamping member for moving said clamping members in opposite directions away from each other, and toward each other for clamping the workpiece.

3. An apparatus for machining the ends of elongated workpieces, comprising, in combination, first transporting means for supporting a series of elongated workpieces in parallel positions in a working plane stepwise in a direction transverse to the longitudinal direction of the same along a path to a plurality of working positions; second transporting means for transporting workpieces in said working positions in the longitudinal direction of the same; first and second tool cutting means located in said working plane on opposite sides of said path and spaced along the same so as to register with workpieces in successive working positions, said first and second tool means being spaced from each other a distance greater than the length of said workpieces so that said second transporting means transport said workpieces to positions in which said first and second tool means, respectively, are positioned to machine the ends of said workpieces; and first and second clamping means respectively located on opposite sides of said path spaced along the same and respectively located in the regions of said first and second tool means, each clamping means including a pair of clamping members located in a plane perpendicular to said working plane on opposite sides of said working plane and being operable in the respective perpendicular plane in a direction transverse to said working plane for clamping said ends of said workpieces in said working position during operation of said tool means; drive means for driving one of said clamping members; and motion transmitting means connecting said one driven clamping member with the other clamping member, and transmitting the motion imparted to said one driven clamping member to the other clamping member for moving said clamping members in opposite directions away from each other, and toward each other for clamping the workpiece.

4. An apparatus according to claim 1 wherein said working plane is substantially horizontal, and wherein said one clamping member is movable in a vertical direction.

5. An apparatus according to claim 1 wherein each clamping means includes a support for mounting said clamping members for movement toward and away from each other.

6. An apparatus according to claim 1, said drive means including a hydraulic cylinder secured to one of said clamping members of each clamping means; a drive piston located in said cylinder; means for stationarily supporting said drive piston; and means for supplying an operating fluid into said cylinder for moving said one clamping member.

7. An apparatus according to claim 6, said motion transmitting means including transmission means connecting said clamping members of each clamping means for simultaneous movement toward and away from each other.

8. An apparatus according to claim 7 and including a carrier for the other clamping member of each clamping means, said carrier having a rack portion; wherein said hydraulic cylinder has a rack portion; and wherein said transmission means include pinions meshing with said rack portions of said carrier and said cylinder, and gear means connecting said pinions for simultaneous rotation.

9. An apparatus according to claim 8 including a support for mounting said carrier and said cylinder for sliding movement toward and away from each other, and for supporting said pinions for turning movement; and wherein said gear means include a pair of pinions connected with said first mentioned pinions for rotation, and a gear ring mounted in said support for turning movement and meshing with said pinions of said pair.

10. An apparatus according to claim 2 wherein said transporting means includes a plurality of plates having aligned bores and extending transverse to said longitudinal direction, and rotary eccentric means located in said bores for moving said plates along a circular path for engaging the workpieces and for placing the same successively in said working positions.

11. An apparatus according to claim 3 wherein each clamping means includes a support for mounting said clamping members for movement toward and away from each other; wherein said drive means include a hydraulic cylinder secured to said one of said clamping members of each clamping means; a piston fixed to said support and located in said cylinder; means for supplying a pressure fluid into said cylinder; and wherein said motion transmitting means include gear means connecting said clamping members of each clamping means for simultaneous movement toward and away from each other.

References Cited

UNITED STATES PATENTS 2,577,766  12/1951  Johnson et al.
2,902,139   9/1959  Brenk et al. _____ 90—56

WILLIAM W. DYER, Jr., *Primary Examiner.*

ANDREW R. JUHASZ, *Examiner.*

G. A. DOST, *Assistant Examiner.*